March 2, 1965     J. R. CRISSEY     3,171,434

FLOW-CONTROL DEVICE

Filed Aug. 2, 1963     2 Sheets-Sheet 1

JACKSON R. CRISSEY

INVENTOR

BY J. H. C. Goldwire

AGENT

JACKSON R. CRISSEY
INVENTOR
BY J.H.C. Goldwire
AGENT

3,171,434
FLOW-CONTROL DEVICE
Jackson R. Crissey, Dallas, Tex., assignor to Ling-Temco-Vought, Inc., Dallas, Tex., a corporation of Delaware
Filed Aug. 2, 1963, Ser. No. 306,403
9 Claims. (Cl. 137—567)

This invention relates to fluid flow control devices and more particularly to means for selectively connecting a hydraulic power source into one or the other of a plurality of hydraulic systems without the possibility of interconnection of the systems.

For reliability, duplicate, independent hydraulic systems are customarily employed, in may types of aircraft, for actuation of devices such as flight control surfaces, etc. It is imperative that neither of the duplicate systems have, at any time, communication with the other, for a rupture in one system could cause failure of both if such communication existed. Further, the very close tolerances in many servo-controlled hydraulic valves makes these valves extremely subject to sticking and other malfunctioning when entered by even relatively small amounts of contaminants in the hydraulic fluid. Although extensive efforts are routinely made to prevent contamination of the hydraulic fluid, such contamination (as by metal particles from a failed pump) continue to occur, and it is obvious that foreign matter in the fluid of one system could enter and interfere with the operation of another system if the two systems were interconnected. It has been known to provide an emergency pump and valving for selectively connecting the same into one or another of independent hydraulic systems; but the valving has always been subject to the possibility of inadvertent connection of one system into the other or at least the leakage of fluid from a given system into another.

It is, accordingly, a major object of the present invention to provide a device for selectively connecting a hydraulic power source into one or the other of a plurality of independent hydraulic systems without any attendant possibility of interconnection of the independent systems or of leakage from one into the other.

A related object is to provide a device of the character mentioned wherein each of the independent hydraulic systems is always separated from each other of the independent hydraulic systems by at least one air space open to the atmosphere.

Another object is to provide a device, of the character indicated, which is relatively simple in construction and of high reliability.

Other objects and advantages will become apparent from the specification and claims and from the accompanying drawing illustrative of the invention.

Figure 1:
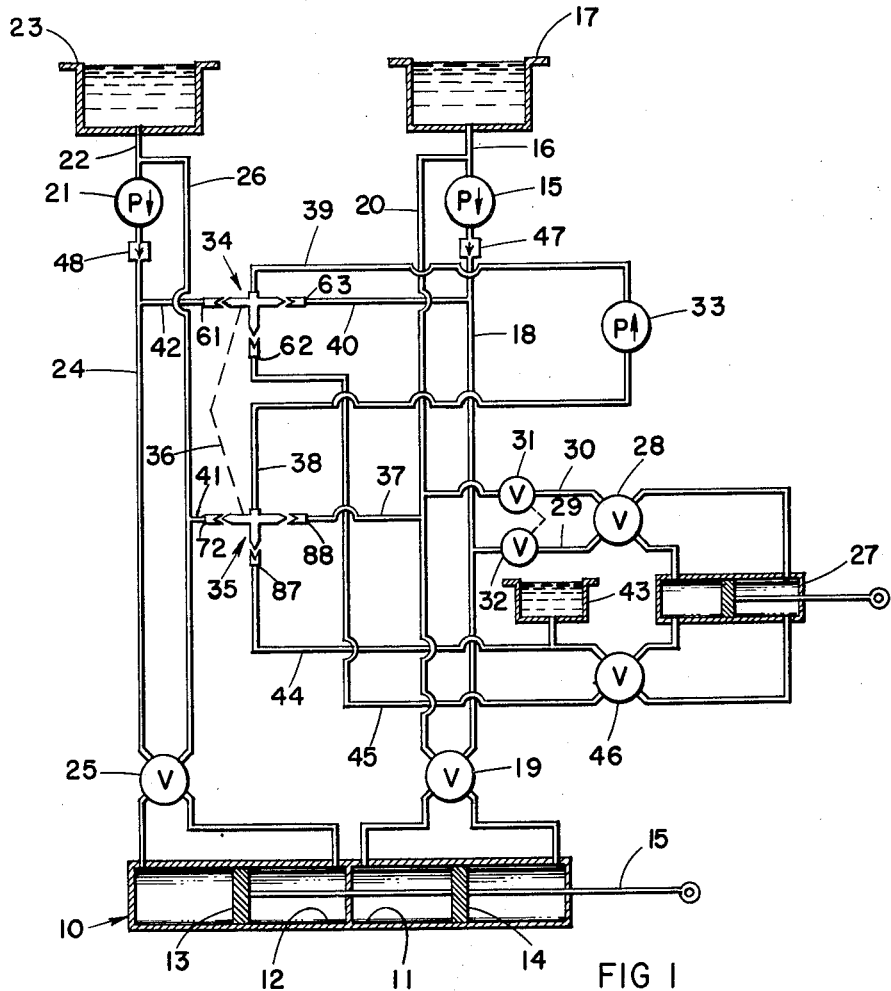
FIGURE 1 is a schematic representation of the flow-control device associated with a plurality of independent hydraulic systems.

With reference to FIGURE 1, the dual, tandem-type hydraulic actuator 10 has first and second chambers 11, 12 and first and second pistons 13, 14 connected to a single piston rod 15. Two independent hydraulic systems are provided for operation of the actuator 10 which is adequately energized by either one of the systems alone in the event of failure of the other system. The first of the independent hydraulic systems comprises a pump 15 receiving fluid through line 16 from a reservoir 17 and delivering fluid under pressure, through line 18 and selector valve 19, into either end of the actuator first chamber 11; return flow from the actuator chamber 11 passes through valve 19 and lines 20, 16 to the reservoir. The second, independent hydraulic system similarly comprises a pump 21 receiving fluid through line 22 from reservoir 23 and directing fluid through line 24 and selector valve 25 into the second chamber 12 of actuator 10. Return flow from the actuator second chamber 12 is through valve 25 and lines 26, 22 to the second reservoir 23. The dual, tandem-type hydraulic actuator 10, energized as described above, will be recognized as a familiar component among the hydraulic provisions of an aircraft and may be employed for example, for actuation of an elevator, aileron, etc. In addition to the two hydraulic systems described, there is also provided a utility system which comprises, for example, a landing gear actuator 27 connectible through selector valve 28 and lines 29, 30 into the pressure and return lines 18, 20 of the first hydraulic system. A pair of linked shut-off valves 31, 32 are interposed in the lines 30, 29 to isolate the utility actuator 27 from the first hydraulic system upon, for example, failure of the first hydraulic system pump 15. With the shut-off valves 31, 32 open, the utility actuator 27 thus operates as a part of the first hydraulic system; with the valves 31, 32 closed, emergency operation of the utility actuator 27 may be obtained through operation of an auxiliary hydraulic pump 33 selectively connectible into the first, second, or utility hydraulic systems by means shown schematically as flow control means units 34, 35. The units 34, 35 are mechanically connected by a linkage 36, and although its modes of connection will be described in detail in later paragraphs, it will be mentioned at this point that the units 34, 35 are movable, in a specific embodiment, between four different positions. In one of these positions, as shown in FIGURE 1, the auxiliary pump 33 is disconnected from all the hydraulic systems. Upon shifting of the units 34, 35 to the right, as upon failure of the first pump 15, the auxiliary pump 33 receives fluid from the first reservoir 17 through lines 20, 37, unit 35, and line 38 and delivers fluid under pressure to the first hydraulic system through line 39, unit 34, and lines 40, 18. To permit motion of portions of the connector units 34, 35, lines 38, 39 are flexible at least at their ends adjacent the units. Upon shifting of the units 34, 35 to the left, the auxiliary pump 33 receives fluid from the second reservoir 23 through lines 26, 41, unit 35, and line 38 and delivers fluid to the second hydraulic system through line 39, unit 34, and lines 42, 24. Moving the units 34, 35 downwardly, as illustrated, causes the auxiliary pump 33 to receive fluid from the emergency reservoir 43 through line 44, unit 35, and line 38 and to deliver fluid to the utility actuator 27 through line 39, unit 34, line 45, and selector valve 46, fluid being returned to the emergency reservoir 43 through selector valve 46 and line 44. As mentioned above, closing the shut-off valves 31, 32 isolates the utility system actuator 27 from the first hydraulic system. The check valves 47, 48, of course, prevent back flow at the pumps 15, 21 when the auxiliary pump 33 is connected into the first or second hydraulic system.

Figure 2:
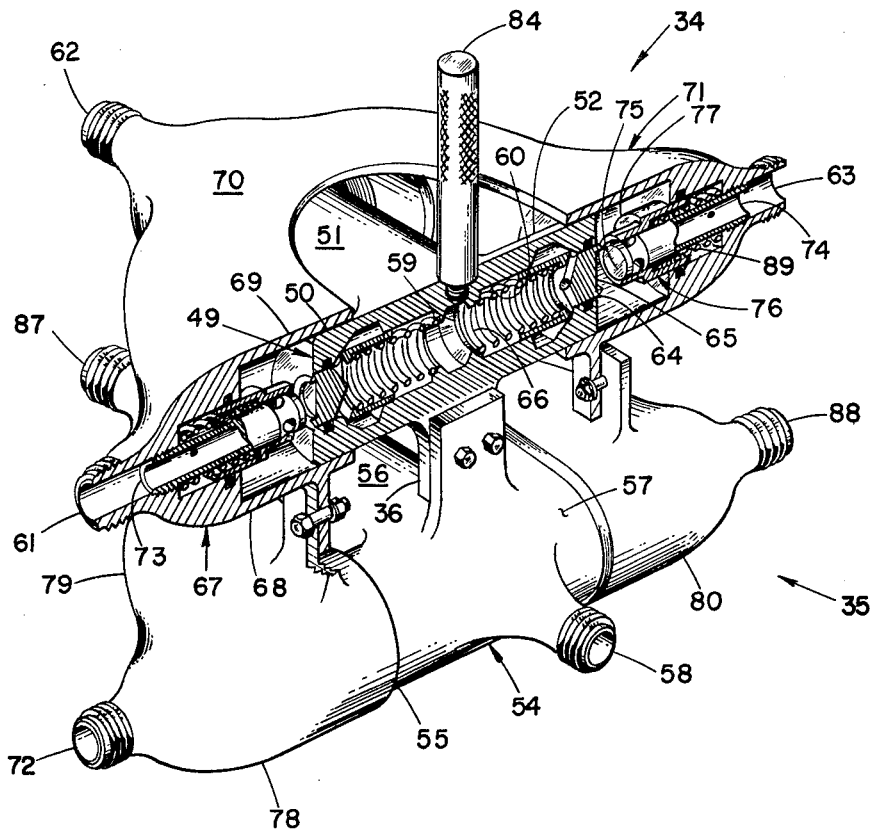
FIGURE 2 is a perspective view of a form of the flow-control device with some parts cut away to show details of interior construction.

Referring now to FIGURE 2, the flow control means 34, 35 will be described. The unit 34 comprises a movable body 49 (in the example, T-shaped) which has a plurality of end portions 50, 51, 52 each having an axis which extends outwardly. Rigidly connected to the first body 49 as by lugs 36 and lying in register therewith is a similar, second body 54 also having first, second, and third arms with respective ends. Since the two bodies 49, 54 are similar, description of either one of them, in the paragraphs which follow, applies also to the other except as may be noted.

Each of the bodies 49, 54 has a port (such as shown at 58 on the second body 54, the corresponding port of the first body 49 not being shown) which opens into a chamber formed internally of the body as shown in the first body 49 at 59. Each arm 50, 51, 52 has a passage, such as at 60, which opens into the chamber 59 and lies between the chamber and another port 61, 62, or 63 (to be described). Each chamber port such as 58 is adapted for connection into a flexible hydraulic line 38 or 39 (FIGURE 1); thus, the chamber port (not shown) of the first body is connected into the outlet of the auxiliary pump 38 by flexible line 39 and the second body port 58 is connected by flexible line 38 into the inlet of auxiliary pump 33.

Interposed in each of the passages such as 60 in the body arms 50, 51, 52 between the body chamber 59 and the additional ports 61, 62, 63 is a hydraulic quick-disconnect half built into and coaxial with the arms or end portions 50, 51, 52 of the body 49. Hydraulic quick-disconnects are well known in the art, and the device is not limited to the specific form of quick-disconnect halves shown and described. In general, however, a typical disconnect half has an orifice 64 through which the outer end of the body passage 60 opens through the end of the arm portion 52, and reciprocatably mounted in the passage 60 is a valve element 65 movable between a first position in which the orifice 64 is closed and a second position in which the orifice is open and fluid therefore is free to flow therethrough from the chamber 59. The valve element 65 is biased to its closed position by a spring 66 or the like footed within the passage 60 and bearing against the inner face of the valve element 64. Pressure on the other face of the normally closed valve element 64 results in its being forced from its first, closed position to its second, open position. The other arms 50, 51 of the movable body 49 are similarly provided with quick disconnect halves communicating with the body chamber 59, that of the second arm 51 not being shown; and equivalent quick-disconnect halves are provided in each arm 55, 56, 57 of the second body 54.

Fixed, interconnected structure is provided for supporting the first and second bodies 49, 54 in respective planes while permitting motion of the bodies 49, 54, in those planes, along the axes of each of the end portions or arms of the bodies. Thus, the support 67 of the first body first arm 50 has lower and upper walls 68, 69 with parallel faces which slidably engage the outer surface of the first arm 50, and similar supports 70, 71 are provided for the second and third arms 51, 52 of the first body 49 and all the arms of the second body 54. The support means bodies 67, 70, 71 permit the associated, T-shaped body 49 to move either longitudinally or laterally between positions which will be further described; and the bodies 67, 70, 71 are rigidly attached together or made in one integral piece.

The additional ports, one for each arm of the two movable bodies, are shown at 61, 62, 63 in the support structure 67, 70, 71 for the first body 49 and at 72, 87, 88 for the similar support structure of the second body 54. The port 61 is typical of the ports other than the chamber ports such as 58, and is formed in the support structure 67, or alternatively, is integral with the fixed tube 73 of a fixed quick-disconnect half (to be described). Threads, etc. adapt each port, such as the port 61, for connection with hydraulic lines; thus, port 63 (refer also to FIGURE 1) connects through line 40 into the pressure line 18 of the first hydraulic pump 15, port 61 to the pressure line 24 of the second hydraulic pump 21 through line 42, and port 62 to the pressure line 45 leading to the selector valve 46 governing emergency operation of the utility actuator 27. At the second unit 35, ports 72, 87, 88 are connected respectively to return lines 26, 44, 20 of the second, emergency, and first reservoirs 23, 43, 17.

Means are provided for selectively connecting any one of the fixed ports such as 61 with the chamber port of a respective movable body 49 or 54, the chamber port of the first movable body 49 being cut away in the drawing but similar to the port 58 of the second movable body 54. This means includes a plurality of disconnect halves rigidly mounted in the fixed, support structure 67, 70, 71 and will be seen to include structure engageable with the valve elements such as 65 for urging the latter to their open positions. The fixed disconnect halves are spaced from each other and are so arranged as to each confront a respective quick-disconnect half of a movable body 49 or 54, the axis of the fixed disconnect half being at zero angle to that of the disconnect half on the movable body. Each fixed disconnect half is adapted for mating with a respective disconnect half of a movable body 49 or 54. A typical, fixed disconnect half comprises the fixed tube such as 74 having a bore communicating with the corresponding port 63 and closed at its inner end by a wall 75 whose outer surface is contacted by the outer face of the mating valve element 65 for moving the latter to its second, open position. The sidewall of the tube 74 is drilled near the wall 75 to provide communication between the interior and exterior of the tube, and the drilled opening normally is closed by a sleeve 76 slidably mounted on the tube 74 and fitting closely about the tube end wall 75. The sleeve 76 is urged to its closed position by a spring 89 or the like. An annular shoulder 77 provided on the sleeve 76 and spaced from its inner end will be seen to be engageable with the outer end 64 of the corresponding, movable disconnect half upon mating of the halves. The movable sleeve 76 serves as a normally closed valve element movable between a first position closing off and a second position permitting fluid flow through the fixed tube 74. The fixed disconnect halves mounted in the remaining portions 67, 70 of the fixed structure are similar to the fixed disconnect half just described.

The device thus will be seen to comprise at least a first two or pair of fixed disconnect halves mounted in the oppositely disposed portions 67, 71 of the fixed structure and related to corresponding, movable disconnect halves in the body arms 49, 52 as described above. The fixed structure portions 78, 80 supporting the arms 55, 57 of the second body 54 contain a corresponding two fixed disconnect halves constructed and related in the same manner as the first two. The first two disconnect halves, at ports 63, 61, have been seen to be adapted for connection into the pressure lines 18, 24 (FIGURE 1) of respective hydraulic systems when, as will be seen, mated with a respective one of the movable disconnect halves of the first body 49. The second two fixed disconnect halves, located in the lower support portions 78, 80, are similarly adapted for connection, via ports 88, 72, with the return lines 20, 26 of respective hydraulic systems.

As shown in FIGURE 2, the first body 49 is movable to a first position in which the movable disconnect halves of the arms 50, 52 are spaced from the corresponding, fixed disconnect halves in the fixed structure portions 67, 71. With the fixed halves in alignment with the movable halves of the body 49, the fixed disconnect half in the fixed structure portion 70 is similarly spaced from the movable disconnect half in the first body second arm 51. Thus, in the first position of the body 49, each of its disconnect halves is spaced, by an air gap open to the atmosphere, from the corresponding fixed disconnect half. Since the first body 49 is rigidly linked with the second body 54 by lugs 36, all the disconnect halves of the latter are similarly spaced, by air gaps open to the atmosphere, from the corresponding, fixed disconnect halves in the fixed structure portions 78, 79, 80. The two bodies 49, 54 are movable together to a plurality (in the example, three) of other positions in each of which a quick disconnect half of each movable body 49, 54 mates with a corresponding fixed disconnect half and each other disconnect half of the bodies 49, 54 is spaced, by an air gap open to the atmosphere, from a confronting one of the fixed disconnect halves. For example, motion of the bodies 49, 54 to the right from their first position (shown in FIGURE 2) to the position shown in FIGURE 3 results in the typical mating of a movable disconnect half of movable body 49 with the fixed disconnect half of structure 71. The inner end of fixed tube 74 enters and seals with the bore 64 of the movable disconnect half, following which the fixed tube end wall 77 strikes and moves to its open position the movable disconnect half valve element 65. Concurrently, the shoulder of movable sleeve 76 is struck by the outer end of the movable disconnect half with the result that the sleeve 76 is moved to its second position in which the tube openings 81 are unobstructed; as a consequence, communication is established between the first body chamber 59, hence, the auxiliary pump pressure line 39 (FIGURE 1) and the fixed port 63 leading, as explained above, to a hydraulic system pressure line 18. Since similar connections are made at the second body 54 (FIGURE 2), connections are simultaneously established between the auxiliary pump inlet line 38 (refer also to FIGURE 1), via port 58, and a hydraulic system reservoir outlet line 20 via fixed port 88. All other fixed and movable disconnect halves remain separated by air gaps open to the atmosphere.

Figure 3:
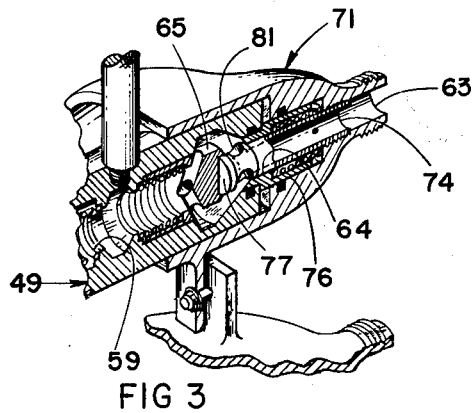
FIGURE 3 is a partial view similar to FIGURE 2 and showing one of the movable quick disconnect halves mated with one of the fixed disconnect halves.

Upon movement of the first and second bodies 49, 54 (FIGURE 2) to the extreme left, the fixed and movable disconnect halves at the opposite ends of the movable bodies 49, 54 are engaged in the same manner as shown in FIGURE 3. Upon centering the movable bodies 49, 54 as shown in FIGURE 2, then moving them rearwardly, the fixed and movable disconnect halves associated with first and second body arms 51, 56 and the corresponding fixed structure portions 70, 79 are engaged in the same manner as the fixed and movable halves shown in FIGURE 3, all other disconnect halves remaining separated, as explained above, by air spaces open to the atmosphere.

Figure 4:
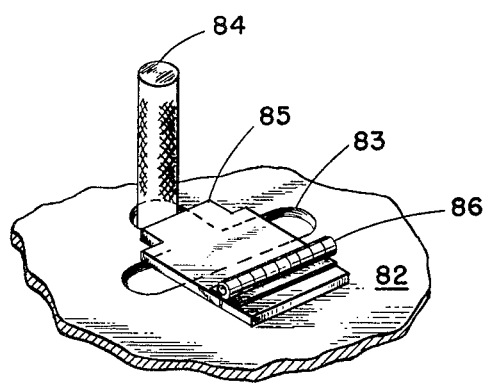
FIGURE 4 is a perspective view showing a guide means for positioning components of the flow-control device.

From the above description, the support structure containing the ports such as 61 (FIGURE 2) will be seen to constitute means for guiding motion of the movable bodies 49, 54 in respective, predetermined planes as the bodies 49, 54 are moved between their first position and a plurality of other positions. Additional guide means are provided, as shown in FIGURE 4, in form of a plate 82 (which is fixed relative to and may or may not be connected to the fixed support structure 67, 70, 71) and a T-shaped slot 83 in the plate. The slot 83 engages an arm 84 rigidly attached to and extending upwardly from the first body 49 and is so formed that the movable bodies 49, 54 can be moved only along paths leading between the positions described. In a preferred embodiment, a hinged plate 85 is provided which, when lying flat against the plate 82, covers all of the slot 83 except for portions occupiable by the rod 84 in each of its three positions in which connections are made between disconnect halves. With the plate 85 lying flat, the rod or arm 84 is locked in its current position; with the plate 85 raised, the arm 84 may be moved to another position. The plate hinge 86 preferably is of the spring type to hold the plate 85 flat and prevent inadvertent repositioning of the arm 84.

As described, connection of any one of the movable hydraulic quick-disconnect halves of a body 49 or 54 with a corresponding fixed connector half as shown in FIGURE 3 is accompanied by the separation, by an air space open to the atmosphere, of each other connector half of the body 49 or 54 from its corresponding fixed connector half. As a consequence, there is no possibility of the interconnection of the hydraulic system utilizing pump 15 (FIGURE 1) with that utilizing pump 21, or either of them with the emergency system utilizing valve 46. Neither is there any possibility of leakage from one system into another, for leakage out of a fixed or movable connector half can enter only the air space or spaces separating the fixed connector halves of different, independent systems. Meanwhile, the device is relatively simple in construction, and, because of this simplicity, its reliability is high.

While only one embodiment of the invention has been described in detail herein and shown in the accompanying drawing, it will be evident that various modifications are possible in the arrangement and construction of its components without departing from the scope of the invention.

I claim:
1. A hydraulic flow-control device comprising:
a body in which there is a chamber;
a port opening into the chamber and adapted for connection into a hydraulic line;
a plurality of other ports in material distinct from the body and adapted for connection into other hydraulic lines;
passages in the body located between the chamber and the other ports;
valve elements interposed in the passages between the chamber and the other ports;
and means for selectively connecting any one of the plurality of other ports with the port which opens into the chamber, said means including structure engageable with the valve elements.

2. A hydraulic flow-control device comprising:
a body in which there is a chamber;
a port opening into the chamber and adapted for connection into a hydraulic line;
a plurality of other ports in material distinct from the body and adapted for connection into other hydraulic lines;
passages in the body located between the chamber and the other ports;
a respective valve element interposed in each of the passageways between the chamber and the other ports;
and means having the function of selectively connecting any one of the plurality of other ports with the chamber port and concurrently providing air spaces between the remainder of the other ports and the chamber port, said means including structure engageable with the valve elements.

3. A hydraulic flow-control device comprising:
a body having at least two ends, a chamber, and a port opening into the chamber;
a hydraulic quick-disconnect half built into each of the at least two ends of the body and communicating with the chamber;
fixed structure;
and at least two spaced, hydraulic quick-disconnect halves rigidly mounted on said structure, each of the structure-mounted disconnect halves confronting and being adapted for mating with a respective one of the disconnect halves of the body,
the body being movable to a first position in which all the disconnect halves of the body are spaced by air gaps open to the atmosphere from the structure-mounted disconnect halves and further being movable to a plurality of other positions in each of which other positions a disconnect half of the body is mated with a structure-mounted disconnect half and each other disconnect half of the body is spaced from a confronting one of the structure-mounted disconnect halves by an air gap open to the atmosphere.

4. The device of claim 3, said device further comprising a flexible hydraulic line connected to the port opening into the chamber.

5. The device of claim 3, said device further comprising means for guiding the body as it is moved to said first position and to said plurality of other positions.

6. A hydraulic flow-control device comprising:
a T-shaped body with first, second, and third arms having respective ends, the body further having a chamber and a port which opens into the chamber;
a hydraulic quick-disconnect half built into each of the arm ends and communicating with the chamber;

a flexible hydraulic line connected into the port; fixed structure;

and three spaced, hydraulic quick-disconnect halves rigidly mounted on said structure, each of the structure-mounted disconnect halves confronting and being adapted for mating with a respective one of the the disconnect halves of the T-shaped body, the body being movable to a first position in which all the disconnect halves of the body are spaced by air gaps open to the atmosphere from the structure-mounted disconnect halves and further being movable to three other positions in each of which other positions a disconnect half of the body is mated with a structure-mounted disconnect half and each remaining disconnect half of the body is spaced from a confronting one of the structure-mounted disconnect halves by an air gap open to the atmosphere.

7. A hydraulic flow control device comprising:

a body having a plurality of end portions each having an axis and extending outwardly from the body;

a normally closed hydraulic quick-disconnect half coaxial with and built into each said end portion of the body;

a port in the body adapted for connection to a flexible hydraulic line and communicating with each of the disconnect halves;

support means holding the body in a fixed plane and permitting motion of the body along the axis of each of the end portions;

a plurality of fixed, normally closed hydraulic quick-disconnect halves rigidly mounted on the support means and each having an axis at zero angle to the axis of a respective one of the disconnect halves on the body;

and a plurality of ports each adapted for connection with a hydraulic line and communicating with a respective one of the fixed disconnect halves, the body being movable between a position in which all the disconnect halves on the body are separated by an air space open to the atmosphere from the fixed disconnect halves and other positions in each of which a respective one of the disconnect halves on the body is mated with a corresponding fixed disconnect half and each other disconnect half on the body is separated by an air space open to the atmosphere from each other fixed disconnect half.

8. In combination with a hydraulic pump with an inlet and an outlet and at least a first and a second independent hydraulic system each having a pressure line, a reservoir, and a reservoir outlet line, a hydraulic flow control device comprising:

a first body having at least two ends, a chamber, and a port opening into the chamber;

a flexible line connecting the first body port into the pump outlet;

a second body rigidly connected to the first body and having at least two ends, a chamber, and a port opening into the chamber;

a flexible line connecting the second body port into the pump inlet;

a hydraulic quick-disconnect half built into each of the at least two ends of the first body and of the second body;

fixed structure;

at least a first two additional hydraulic quick-disconnect halves adapted for mating with and each confronting a respective one of the disconnect halves of the first body, each of the first two additional disconnect halves being adapted for connection into the pressure line of a respective one of the hydraulic systems while mated with a respective one of the disconnect halves of the first body and further being mounted on the fixed structure;

and at least a second two additional hydraulic quick-disconnect halves adapted for mating with and each confronting a respective one of the disconnect halves of the second body, each of the second two disconnect halves being adapted for connection into the return line of a respective one of the hydraulic systems while mated with a respective one of the disconnect halves of the second body and further being mounted on the fixed structure, the bodies being movable together to a first position in which all the disconnect halves of the bodies are spaced by air gaps open to the atmosphere from the structure-mounted disconnect halves and further being movable to a plurality of other positions in each of which other positions a respective disconnect half of each body is mated with a respective structure-mounted disconnect half and the remaining disconnect halves of the bodies are spaced from the remaining structure-mounted disconnect halves by air gaps open to the atmosphere.

9. A hydraulic flow-control device comprising:

a body having at least two ends, a chamber, and a port opening into the chamber;

a hydraulic quick-disconnect half built into each of the at least two ends of the body and communicating with the chamber, each of the disconnect halves including a valve element movable between a first position in which it closes off fluid flow through the disconnect half and a second position permitting fluid flow through the disconnect half, each disconnect half further including means biasing the respective valve element to its first, closed position;

fixed structure;

at least two spaced, hydraulic quick-disconnect halves rigidly mounted on said structure, each of the structure-mounted disconnect halves confronting and being adapted for mating with a respective one of the disconnect halves of the body, each of the structure-mounted disconnect halves including a valve element movable between a first position closing off and a second position permitting fluid flow through the corresponding disconnect half and further including means biasing the respective valve element to its first position, the body being movable to a first position in which all the disconnect halves of the body are spaced by air gaps open to the atmosphere from the structure-mounted disconnect halves and further being movable to a plurality of other positions in each of which other positions a disconnect half of the body is mated with a structure-mounted disconnect half and each other disconnect half of the body is spaced from a confronting one of the structure-mounted disconnect halves by an air gap open to the atmosphere, each of the disconnect halves having structure which strikes and forces to its second position the valve element of another of the disconnect halves mated therewith upon the body being moved to one of said plurality of other positions.

No references cited.

M. CARY NELSON, *Primary Examiner.*